US005269866A

United States Patent [19]

Kushida et al.

[11] Patent Number: 5,269,866

[45] Date of Patent: Dec. 14, 1993

[54] THERMAL TRANSFER MATERIAL AND THERMAL TRANSFER RECORDING METHOD

[75] Inventors: Naoki Kushida, Yokohama; Koichi Tohma, Tachikawa, both of Japan

[73] Assignee: Canon Kabushiki Kaisha, Tokyo, Japan

[21] Appl. No.: 932,740

[22] Filed: Aug. 25, 1992

Related U.S. Application Data

[63] Continuation of Ser. No. 399,008, Aug. 28, 1989, abandoned.

[30] Foreign Application Priority Data

Sep. 2, 1988 [JP] Japan ................................ 63-219971

[51] Int. Cl.⁵ ......................... B32B 31/00; B41J 29/00

[52] U.S. Cl. ..................................... 156/234; 156/235; 156/240; 156/241; 156/277; 400/695; 400/120; 428/913

[58] Field of Search ............... 156/240, 234, 235, 241, 156/277; 400/120 MT, 696, 695, 697.1, 697; 428/913

[56] References Cited

U.S. PATENT DOCUMENTS

| | | | |
|---|---|---|---|
| 4,235,657 | 11/1980 | Greenman et al. | 156/234 |
| 4,396,308 | 8/1983 | Applegate et al. | 400/696 |
| 4,453,839 | 6/1984 | Findlay et al. | 400/120 |
| 4,684,271 | 8/1987 | Wellman et al. | 400/120 |
| 4,687,360 | 8/1987 | Wellman et al. | 400/120 |
| 4,739,338 | 4/1988 | Tanaka et al. | 400/120 |
| 4,748,151 | 5/1988 | Murata et al. | 503/227 |
| 4,834,567 | 5/1989 | Ueno | 400/120 |
| 4,875,961 | 10/1989 | Oike et al. | 156/234 |
| 5,120,383 | 6/1992 | Takei et al. | 156/240 |

FOREIGN PATENT DOCUMENTS

| | | |
|---|---|---|
| 238242 | 9/1987 | European Pat. Off. . |
| 3507097 | 5/1985 | Fed. Rep. of Germany . |
| 3726007 | 2/1988 | Fed. Rep. of Germany . |
| 2069160 | 8/1981 | United Kingdom . |

OTHER PUBLICATIONS

IBM Technical Disclosure Bulletin, vol. 27, No. 6, p. 3198 (Nov. 1984).

Patent Abstracts of Japan, vol. 11, No. 128 (M-583) (25-75) Apr. 22, 1987.

Patent Abstracts of Japan, vol. 12, No. 121 (M-686) (2968), Apr. 15, 1988.

Patent Abstracts of Japan, vol. 12, No. 352 (M-744), Sep. 21, 1988.

*Primary Examiner*—David A. Simmons
*Assistant Examiner*—Chester T. Barry
*Attorney, Agent, or Firm*—Fitzpatrick, Cella, Harper & Scinto

[57] ABSTRACT

A thermal transfer material comprising at least a support, a first ink layer, a second ink layer, a third ink layer and a fourth ink layer disposed in this order on the support, wherein the first ink layer predominantly comprises a water-soluble polyester resin, the second ink layer is capable of causing separation from the first ink layer on heating, and third and fourth ink layers predominantly comprises a thermoplastic resin.

23 Claims, 2 Drawing Sheets

THERMAL TRANSFER MATERIAL AND THERMAL TRANSFER RECORDING METHOD

This application is a continuation of application Ser. No. 399,008 filed Aug. 28, 1989, now abandoned.

FIELD OF THE INVENTION AND RELATED ART

The present invention relates to a thermal transfer material for use in a thermal transfer recording method capable of providing a recorded image of good quality, which is removable by a lift-off correction, on a recording medium having a low surface smoothness, and also relates to a thermal transfer recording method using the thermal transfer material.

The thermal or heat-sensitive transfer recording method has recently been widely used because it has general advantages of the thermal recording method such that the apparatus employed is light in weight, compact, free of noise, excellent in operability and adapted to easy maintenance, and also has other advantages such that it does not require a color-formation type converted paper but provides recorded images with excellent durability.

However, the thermal transfer recording method still involves some drawbacks to be remedied. One of the drawbacks is that it can provide only a relatively poor image on a recording medium (or a medium to be transfer-printed) with a low surface smoothness such as paper. Another drawback is that a transfer-recorded image is not easily erased even if it is recorded erroneously.

As a general method for correction of erroneously recorded images or error images in general, it may be conceived to use a hiding paint which has been widely used in recent years. Especially in the thermal transfer recording, it has also been proposed to use a thermal transfer material having a thermal transfer ink layer containing a hiding colorant of substantially the same color as the recording medium and to cover an error image with the transfer ink layer. It is however difficult to use a colorant having exactly the same color as the recording medium, and the corrected portion is liable to become somewhat convex by coverage with the ink layer and is readily noticeable to provide an undesirable appearance.

As correction methods free from such difficulties, there have been proposed a method of peeling through adhesion of an erroneously recorded image on a recording medium by using a heat-sensitive adhesive tape, (i.e., so-called "lift-off correction" method). However, such correction method requires both of a thermal transfer material for providing a transferred image on a recording medium, and a correction sheet for erasing the transferred image, and a thermal transfer printer therefor requires a change mechanism for changing the tapes for printing and correction with each other. As a result, the printer undesirably becomes larger and the structure thereof becomes more complex.

In order to solve the above-mentioned problem, there has been proposed a "self-correctable" (or self-correcting) thermal transfer material which not only can provide a transfer-recorded image but also can conduct the lift-off correction by itself.

For example, Japanese Laid-Open Patent Application (KOKAI) No. 74368/1983 discloses a heat-sensitive laminate material which comprises a resistance support and an active layer disposed thereon, and is capable of both recording and correction. The above-mentioned active layer is so constituted that it develops adhesion and can erase the transfer-recorded image by peeling the image, when it is heated up to a temperature lower than that for recording.

Further, Japanese Laid-Open Patent Application No. 23992/1986 discloses a thermal transfer material comprising a support and a layer disposed thereon which comprises a colorant, a binder, and heat-sensitive adhesive material having a higher softening point than that of the binder. In this Application, a transferred image is formed by applying a low thermal energy to the thermal transfer material by using a thermal head as a heat source, and an erroneously transferred image is peeled and erased by applying thereto a higher energy than that for recording. Further, U.S. Pat. No. 4,396,308 discloses another self-correcting recording method.

However, in the above-mentioned conventional self-correctable thermal transfer material, it is extremely difficult to satisfy both of the transfer material performances for effecting a recording and eraser performances for effecting the lift-off correction of a recorded image formed on a recording medium, with respect to not only a recording medium having good surface smoothness but also a recording medium having poor surface smoothness. Particularly, when a recorded image is intended to be erased by peeling the recorded image toward a thermal transfer material side, there tends to occur a reverse transfer phenomenon such that the ink of the thermal transfer material is peeled toward the transferred recorded image.

In view of such a problem, our research group has proposed a thermal transfer material which is capable of giving recorded images of high quality not only on a recording medium having good surface smoothness but also on a recording medium having poor recorded image by lift-off correction, (U.S. patent application Ser. No. 276,021).

However, there is still room for improvement in the above-mentioned thermal transfer material. Particularly, there is desired a thermal transfer material capable of effecting recorded image formation and lift-off correction without an obstacle, even under a condition of very low humidity.

SUMMARY OF THE INVENTION

An object of the present invention is to provide a thermal transfer material which is capable of giving recorded images of high quality, not only on a recording medium having good surface smoothness but also on a recording medium having poor surface smoothness and is capable of erasing the recorded image by lift-off correction.

Another object of the present invention is to provide a thermal transfer material which is capable of providing recorded images of high quality and is capable of erasing the recorded image by lift-off correction, even under a low-humidity condition.

As a result of our study, we have found that the above-mentioned reverse transfer under a low-humidity condition is attributable to an elasticity decrease in a recording paper and to the penetration of its convexities into the ink layer of a thermal transfer material. More specifically, according to our investigation, the reverse transfer may be caused in the following manner.

Thus, when a recording paper is used under a low-humidity condition, the recording paper is dried so as to decrease its elasticity. On the basis of such elasticity decrease, when the ink layer of a thermal transfer material is transferred to the recording paper, the convexities of the recording paper surface deeply penetrate into the ink layer. As a result, even when an erroneously recorded image is intended to be erased by peeling or lift-off correction, the recorded image is difficult to be peeled from the recording paper, whereby the reverse transfer is liable to occur.

The thermal transfer material according to the present invention is based on the above discovery and comprises: at least a support, a first ink layer, a second ink layer, a third ink layer and a fourth ink layer disposed in this order on the support; the first ink layer predominantly comprising a water-soluble polyester resin; the second ink layer being capable of causing separation from the first ink layer on heating; the third and fourth ink layers predominantly comprising a thermoplastic resin.

The present invention also provides a thermal transfer material, comprising at least a support, a first ink layer, a second ink layer, a third ink layer and a fourth ink layer disposed in this order on the support; the first ink layer predominantly comprising a water-soluble polyester resin; the second ink layer comprising a water-soluble polyester resin and being capable of causing separation from the first ink layer on heating; the third and fourth ink layers predominantly comprising a thermoplastic resin.

The present invention further provides a thermal transfer recording method, comprising:

providing either one of the above-mentioned thermal transfer materials;

superposing the transfer material on a recording medium so that the fourth ink layer faces the recording medium;

heating the transfer material in a pattern;

separating the transfer material from the recording medium immediately after the transfer material is heated and before the second ink layer restores its cohesive strength before heating, thereby to cause separation of the second ink layer from the first ink layer and to leave a recorded image on the recording medium;

causing the transfer material again to adhere to the recorded image under heating; and separating the transfer material from the recording medium without causing separation of the second ink layer, thereby to peel at least a part of the recorded image from the recording medium toward the transfer material.

These and other objects, features and advantages of the present invention will become more apparent upon a consideration of the following description of the preferred embodiments of the present invention taken in conjunction with the accompanying drawings. In the following description, "%" and "parts" representing quantity ratios are by weight unless otherwise noted specifically.

DETAILED DESCRIPTION OF THE INVENTION

Figure 1:
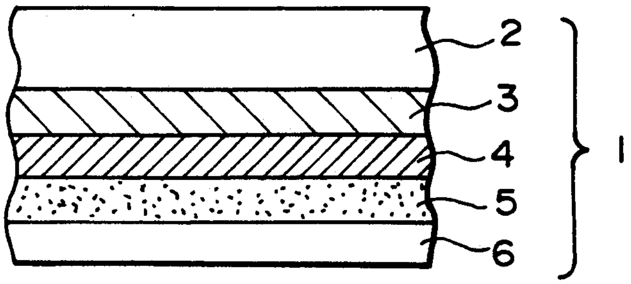
FIG. 1 is schematic view showing a section across the thickness of an embodiment of the thermal transfer material according to the present invention.

Referring to FIG. 1, the thermal transfer material 1 according to the present invention comprises, at least, a support 2, and a first ink layer 3, a second ink layer 4, a third ink layer 5 and a fourth ink layer 6 disposed in this order on the support 2.

In the present invention, the first ink layer 3 is so constituted that it has strong adhesion to the support 2 without causing separation therein or at the interface between it and the support 2, even at the time of recording under heating. Namely, the first ink layer 3 is not substantially transferred to a recording medium even at the time of recording under heating.

The second ink layer 4 causes separation therein or at the interface between it and the first ink layer 3 at the time of recording under heating, thereby to facilitate the transfer of the third ink layer 5 and fourth ink layer 6 to a recording medium. However, the non-heated portion of the second ink layer 4 is strongly bonded to the first ink layer 3 and the third ink layer 5 to suppress the transfer of the third ink layer 5 to the recording medium. Based on such contrast between the heated and non-heated portions, there is formed a transferred recorded image corresponding to a given heating pattern.

The third ink layer 5 and fourth ink layer 6 comprise a binder material predominantly comprising a resin. These ink layers may be transferred to a recording medium having a low surface smoothness so that the ink layer may bridge the convexities of the recording medium surface and cover the concavities of the recording medium.

In a thermal transfer recording method using the thermal transfer material 1 of the present invention, the thermal transfer material 1 is superposed on a recording medium such as plain paper and is heated in a pattern, e.g., by using a thermal head. When the thermal transfer material 1 is peeled from the recording medium immediately after the thermal transfer material is heated in a pattern and before the strength of the second ink layer 4 becomes sufficiently large, separation occurs at or in the second ink layer 4, whereby a recorded image is formed on the recording medium.

On the other hand, when the thermal transfer material 1 is caused to contact the recorded image formed on the recording medium and is heated, and then the thermal transfer material 1 is peeled from the recording medium after the strength of the second ink layer 4 becomes sufficiently large, the recorded image formed on the recording medium is peeled and removed from the recording medium.

In the present invention, the first ink layer 3 strongly adheres to the support 2 even at the time of recording under heating as described hereinabove, and the first ink layer 3 strongly adheres to the second ink layer 4 and the support 2 also at the time of peeling of an erroneously recorded image, i.e., at the time at which the strength of the second ink layer 4 becomes sufficiently large after the termination of heating. Accordingly, the thermal transfer material according to the present invention may peel an erroneously recorded image disposed on a recording medium without causing reverse transfer. Such a first ink layer 3 may preferably comprise a polyester resin, particularly a water-soluble polyester resin because of the following reason. The "water-soluble polyester resin" used herein may preferably be a polyester resin which is capable of being dissolved in 100 g of water in an amount of 5 g or more (more preferably 10 g or more) at 90° C., and is capable of providing a solution or emulsion when cooled at 25° C.

More specifically, in order to improve the edge-cutting property of a transferred image (i.e., to sharply cut the edge portion of a recorded image so as not to form an edge portion with indentations), it is preferred to form the second ink layer 4, third ink layer 5 and fourth ink layer 6 by application of an aqueous emulsion so that the particulate property of the emulsion may remain (e.g., by drying the applied emulsion at a temperature lower than the film-making temperature of the emulstion). Particularly, because the third ink layer 5 and fourth ink layer 6 may preferably be transferred to a recording medium so as to enhance the film strength of the heated portion and to bridge the convexities of the recording medium surface, it is preferred that the film strength is considerably changed with respect to the heated and non-heated portions. Accordingly, it is preferred that the particulate property remains in the non-heated portion and sharp cutting occurs at the boundary between the heated and non-heated portions.

On the other hand, in a case where an erroneously recorded image is erased by peeling, in order to suppress the reverse transfer, it is preferred that the respective ink layers are caused to closely contact each other. Further, when a water-soluble polyester resin is used in the first ink layer 3, the respective ink layers may be formed by using aqueous coating liquids, whereby the adhesion strengths between the respective ink layers are improved. As a result, when the water-soluble polyester resin is used in the first ink layer 3, not only an erroneously recorded image can be erased by peeling without causing reverse transfer but also recorded images having good edge-cutting property are provided.

In the above-mentioned coating liquid for forming an ink layer, a solution of a binder which is soluble in an organic solvent can be mixed as long as it does not impair the particulate property of an emulsion or it does not break the emulsion. It is preferred that the resin soluble in an organic solvent constitutes 30% or smaller, more preferably 10% or smaller, of the first ink layer 3.

The amount of a water-soluble polyester resin constituting the first ink layer 3 may preferably be 70–100%, more preferably 90–100%, based on the weight of the first ink layer 3.

In the present invention, the water-soluble polyester resin may preferably have a weight-average molecular weight of 5,000 or higher, more preferably 8,000–25,000. In a case where the weight-average molecular weight is too small, the cohesion of the first ink layer 3 becomes smaller than that of the second ink layer 4 when the thermal transfer material is heated (at the time of printing), or is cooled after heating (at the time of erasure), whereby failure in a recorded image or reverse transfer is liable to occur. On the other hand, the weight-average molecular image is too large, it becomes difficult to dissolve the water-soluble polyester resin in an aqueous solvent, whereby the dissolution undesirably takes a considerable time. Therefore, the weight-average molecular weight of the water-soluble polyester resin may preferably be 30,000 or smaller, more preferably 25,000 or smaller.

The water-soluble polyester resin used in the first ink layer 3 may preferably have a glass transition point of 30° C. or lower, more preferably 25° C. or lower. When the glass transition point is too high, the flexibility of the first ink layer 3 is decreased, whereby its adhesion strength to the support 2 is decreased. As a result, there sometimes occurs reverse transfer due to the interfacial separation between the support 2 and the first ink layer 3. On the other hand, the lower limit of the glass transition point is not particularly restricted, while somewhat tack occurs and the handling of the resin becomes somewhat difficult when the glass transition point is lower than 0° C.

The weight-average molecular weight used herein is one measured by means of a GPC (gel permeation chromatography). More specifically, a sample is dissolved in DMF (dimethylformamide) and analyzed by means of a liquid chromatography apparatus (mfd. by Shimazu Seisakusho), thereby to obtain the weight-average molecular weight.

The glass transition point used herein is one measured by means of a differential scanning calorimeter (DSC). More specifically, a sample is analyzed by means of a DSC (DSC-7, mfd. by Perkin-Elmer) at a temperature increasing rate of 5° C./min., whereby an endothermic peak is observed.

The water-soluble polyester resin may preferably be one comprising a glycol ($HO—R_1—OH$), or polyester glycol having a hydroxyl group at the end thereof; a dicarboxylic acid ($HOOC—R_2—COOH$); and a monomer having a sulfonic acid salt group or carboxylic acid group required for solubilization in water.

Specific examples of the glycol include: ethylene glycol, propylene glycol, 1,3-propanediol, 2,4-dimethyl-2-ethylhexane-1,3-diol, 2,2-dimethyl-1,3-propanediol, 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, 2,2,4-trimethyl-1,6-hexanediol, 1,2-cyclohexanedimethanol, 1,3-cyclohexanedimethanol, 1,4-cyclohexanedimethanol, 2,2,4,4-tetramethyl-1,3-cyclobutanediol, 4,4'-thiodiphenol, 4,4'-methylenediphenol, 4,4'-(2-norbornylidene)diphenol, 4,4'-dihydroxybiphenyl, o, m- and p-dihydroxybenzene, 4,4'-isopropylidenediphenol, 4,4'-isopropylidenebis(2,6-dichlorophenol), 2,5-naphthalenediol, and p-xylenediol; alkylene glycols such as copolymers produced from two or more species selected from the above-mentioned diols; polyethylene glycol represented by a general formula of $H(OCH_2CH_2)_nOH$, wherein n denotes a number of 2–10; and a mixture of these diols.

Specific examples of the dicarboxylic acid include: oxalic acid, malonic acid, dimethylmalonic acid, succinic acid, glutaric acid, adipic acid, trimethyladipic acid, pimelic acid, 2,2-dimethylglutaric acid, azelaic acid, sebacic acid, fumaric acid, maleic acid, itaconic acid, 1,3-cyclopentanedicarboxylic acid, 1,2-cyclohexanedicarboxylic acid, 1,3-cyclohexanedicarboxylic acid, 1,4-cyclohexanedicarboxylic acid, phthalic acid, terephthalic acid, isophthalic acid, 2,5-norbornanedicarboxylic acid, 1,4-naphthalic acid, diphenic acid, 4,4'-oxybenzoic acid, diglycollic acid, thiodipropionic acid, and 2,5-naphthalene dicarboxylic acid. The term "dicarboxylic acid" used herein also includes acid anhydrides, esters, and acid chlorides corresponding to the above-mentioned acid.

Specific examples of the dicarboxylic acid monomer containing a sulfonic acid salt group or carboxylic acid group required for solubilization in water include: aromatic dicarboxylic acid derivatives having a sulfonic acid salt group such as sodium sulfophthalic acid, sodium sulfoisophthalic acid, potassium sulfophthalic acid, potassium sulfoisophthalic acid, and esters of these compounds; and tetracarboxylic acid dianhydride such as 1,2,4,5-benzenetetracarboxylic acid dianhydride (pyromellitic acid anhydride), 1,2,3,4-butanetetracarboxylic acid dianhydride, 1,2,3,4-pentanetetracarboxylic acid dianhydride, 3,3',4,4'-benzophenonetetracarboxylic acid dianhydride, 5-(2,5-dioxotetrahydrofurfuryl)-3-methyl-3-cyclohexene-1,2-dicarboxylic acid anhydride, cyclopentanetetracarboxylic acid dianhydride, 2,3,6,7-naphthalenetetracarboxylic acid dianhydride, ethylene glycol bis-trimellitate dianhydride, 2,2',3,3'-diphenyltetracarboxylic acid dianhydride, and thiophene-2,3,4,5-tetracarboxylic acid dianhydride.

The amount of the dicarboxylic acid containing a sulfonic or carboxylic acid group for water-solubilization may preferably be 5–100 mol, more preferably 7–30 mol, with respect to 100 mol of the dicarboxylic acid (HOOC—$R_2$—COOH).

It is possible to admix a filler, such as titanium oxide, clay, zinc oxide or alumina hydrate; a plasticizer, a stabilizer, a surfactant, etc., with the above-mentioned material as desired.

In order to dissolve the water-soluble polyester resin in water, it is possible to use another solvent in combination with water. In such a case, the water content may preferably be 50% or more, more preferably 65% or more, with respect to the total solvent. Specific examples of such a solvent may include cellosolves such as ethyl cellosolve, alcohols such as ethyl alcohol and isopropyl alcohol, etc.

The second ink layer 4 may preferably be one which can sharply be melted under heating. Accordingly, in view of the sharp-melting property, the second ink layer 4 may preferably have a melting point of 50° C. or above, and may preferably have a melt viscosity of 500 cps or below at 150° C. The second ink layer 4 may preferably comprise a material as described below, particularly a wax.

Example of the above-mentioned wax may include natural waxes including vegetable waxes such as carnauba wax, candelilla wax, rice wax, and haze wax; mineral waxes such as ceresine wax, montan wax and derivatives of these (e.g., derivatives of montan wax including acid wax, ester wax and partially saponified ester wax); and petroleum waxes such as paraffin wax, and microcrystalline wax. Further, there can be used synthetic waxes including polyethylene wax (particularly, low-molecular weight oxidized polyethylene), and Fischer-Tropsch wax. The above-mentioned wax may preferably constitute 80% or more, more preferably 90% or more, of the second ink layer 4. These waxes may be used singly or as a mixture so as to satisfy the above-mentioned melting point and melt viscosity.

The melt viscosity used in the present invention refers to a value measured by a rotary viscometer (Model: Rotovisco RV 12, mfd. by Haake Co., West Germany) using a rotor (PK-I-0.3), while changing the rotational speed.

In order to form the second ink layer 4, it is possible to admix a filler, such as titanium oxide, clay, zinc oxide or alumina hydrate; a plasticizer, a surfactant, a stabilizer, etc., with the above-mentioned wax as desired.

In the present invention, since the third ink layer 5 and fourth ink layer 6 comprise a binder material predominantly comprising a thermoplastic resin, they may be transferred to a recording medium with a low surface smoothness so as to bridge convexities of the recording medium surface. The "binder material" used herein refers to a component constituting an ink layer other than a colorant.

In the present invention, the third ink layer 5 may preferably contain a colorant but the fourth ink layer 6 may preferably contain substantially no colorant. Because the fourth ink layer 6 is one contacting a recording medium, when the fourth ink layer 6 contains a considerable amount of a colorant, it sometime leaves a correction trace even after it is subjected to erasure operation by peeling (i.e., lift-off correction).

The binder material constituting the third ink layer 5 may comprise a thermoplastic resin. Preferred examples thereof include: polyolefin resins, polyamide resins, polyester resins, epoxy resins, polyurethane resins, acrylic resins, polyvinyl chloride resins, cellulose resins, polyvinyl alcohol resins, petroleum resins, phenolic resins, styrene resins, and vinyl acetate resins; elastomers such as natural rubber, styrene-butadiene rubber, isoprene rubber, chloroprene rubber and the like; and polyisobutylene, polybutene. The thermoplastic resin may preferably constitute 50% or more, more preferably 70% or more, of the binder material.

Such a binder material may appropriately, be mixed, as desired, with a material other than resin, including: natural waxes such as whale wax, beeswax, lanolin, carnauba wax, candelilla wax, montan wax, ceresin wax and the like; petroleum waxes such as paraffin wax and microcrystalline wax; synthetic waxes such as oxidized wax, ester wax, Fischer-Tropsch wax, polyethylene wax, and the like; higher fatty acids such as lauric acid, myristic acid, palmitic acid, stearic acid, behenic acid and the like; higher alcohols such as stearyl alcohol, behenyl alcohol and the like; esters such as fatty acid esters of sucrose, fatty acid esters of sorbitan and the like; amides such as oleic amide and the like; plasticizers, oils such as mineral oils or vegetable oils.

The third ink layer 5 may preferably contain 3–90%, more preferably 5–80% particularly preferably 10–80% thereof of a colorant. Further, the third ink layer 5 may optionally comprise an additive such as filler comprising metal fine powder, inorganic fine powder, metal oxide fine powder, etc.

Specific examples of the colorant contained in the third ink layer 5 may include one or more of known dyes or pigments such as carbon black, Nigrosin dyes, lamp black, Sudan Black SM, Fast Yellow G, Benzidine Yellow, Pigment Yellow, Indo Fast Orange, Irgadine Red, Paranitroaniline Red, Toluidine Red, Carmine FB, Permanent Bordeaux FRR, Pigment Orange R, Lithol Red 2G, Lake Red C, Rhodamine FB, Rhodamine B Lake, Methyl Violet B Lake, Phthalocyanine Blue, Pigment Blue, Brilliant Green B, Phthalocyanine Green, Oil Yellow GG, Zapon Fast Yellow CGG, Kayaset Y963, Kayaset YG, Smiplast Yellow GG, Zapon Fast Orange RR, Oil Scarlet, Smiplast Orange G, Orasol Brown G, Zapon Fast Scarlet CG, Aizen Spiron Red BEH, Oil Pink OP, Victoria Blue F4R, Fastgen Blue 5007, Sudan Blue, and Oil Peacock Blue.

The binder material used in the fourth ink layer 6 may be one used in the above-mentioned third ink layer 5, as such. In the fourth ink layer 6, the thermoplastic resin may preferably constitute 50% or more, more preferably 70% or more, of the binder material.

As described above, the fourth ink layer 6 can contain a colorant. However, it is not preferred to add an excess amount of a colorant because such addition can cause a trace of correction. In a case where a colorant is contained in the fourth ink layer 6, the colorant content may preferably be 5% or less, more preferably 3% or less.

In the third ink layer 5 and fourth ink layer 6, the control of the film strength immediately after the heat application, i.e., at the time of recording, may be accomplished by appropriately selecting the materials for the respective ink layers from the group of materials mentioned above and adjusting the molecular weight and cohesion forces of such materials.

In order to obtain good transferability to a recording medium having a low surface smoothness, it is preferred that the cohesion and the molecular weight are as high as possible. It is preferred to use as a predominant component a polymer material, preferably comprising predominantly of olefin, such as low-molecular weight oxidized polyethylene, ethylene-vinyl acetate copolymer, vinyl acetate-ethylene copolymer ethylene-acrylic acid copolymer, ethylene-methacrylic acid copolymer, ethylene-acrylic acid ester copolymer, or polyamide, polyester, etc.

As the support 2, it is possible to use films known in the art as such. For example, films of plastics having relatively good heat-resistance such as polyester, polycarbonate, triacetylcellulose, polyamide, polyimide, etc. It is particularly preferred to use a polyester film as the support 2, in view of the adhesive property thereof to the first ink layer 3.

Also, in the case of using a thermal head as means for applying heat to the thermal transfer material, the surface of the support to contact the thermal head can be provided with a heat-resistant protective layer comprising a silicone resin, a fluorine-containing resin, a polyimide resin, an epoxy resin, a phenolic resin, a melamine resin or nitrocellulose to improve the heat resistance of the support. Alternatively, a support material which could not be used in the prior art can also be used by provision of such a protective layer.

The thermal transfer material according to the present invention may preferably have a total thickness of 10-30 microns, more preferably 15-25 microns. The support 2 may preferably have a thickness of 3-15 microns, more preferably 4.5-15 microns, particularly preferable 6-12 microns. Each of the first, second and third ink layers may preferably have a thickness of 0.5-3 microns, more preferably 1-2.5 micron, and the fourth ink layer may preferably have a thickness of 3-10 microns, more preferably 4-8 microns.

In the above-mentioned embodiment of the present invention, a water-soluble polyester resin is used in the first ink layer 3. Further, the second ink layer 4 can comprise a water-soluble polyester resin. In a case where the second ink layer 4 comprises the water-soluble polyester resin, good adhesion between the second ink layer 4 and the first ink layer 3, and further good adhesion between the second ink layer 4 and the third ink layer 5 are obtained, whereby the reverse transfer at the time of lift-off correction is prevented more surely.

Also in such an embodiment, the second ink layer 4 may be melted under heating to cause cohesion failure, and may have a function of separating the third ink layer 5 and the fourth ink layer 6 from the support 2 and the first ink layer 3. Accordingly, it is preferred that the second ink layer 4 predominantly comprises a wax providing a small cohesion under heating and a water-soluble polyester resin.

The second ink layer 4 may preferably contain 45% or less, more preferably 40% or less thereof of a water-soluble polyester resin. If the amount of the water-soluble polyester resin contained in the second ink layer 4 is too small, the adhesion between the first ink layer 3 and the second ink layer 4 is decreased. If the amount of the water-soluble polyester resin is too large, the second ink layer 4 has a large cohesion under heating, whereby not only thinning of a printed letter image but also lack of the printed letter is liable to occur, while the reverse transfer is sufficiently suppressed.

The water-soluble polyester resin contained in the second ink layer 4 may preferably have a glass transition point of 30° C. or lower for the same reason as in the polyester resin constituting the first ink layer 3. Further, the water-soluble polyester resin contained in the second ink layer 4 may preferably have a weight-average molecular weight of 5,000-25,000, more preferably 10,000-20,000. If the weight-average molecular weight is smaller than 5,000, the effect of the water-soluble polyester resin contained in the second ink layer 4 is not sufficient. If the weight-average molecular weight is larger than 25,000, lack of a printed letter is liable to occur.

The water-soluble polyester resin used in the second ink layer 4 may be one selected from those constituting the above-mentioned first ink layer. The second ink layer 4 can comprise a wax and/or a thermoplastic resin, in addition to the water-soluble polyester resin. In such a case, the wax contained in the second ink layer 4 may be one selected from the above-mentioned waxes to be used in the second ink layer 4. In a case where a thermoplastic resin is contained in the second ink layer 4, the thermoplastic resin content may preferably be 30% or less, more preferably 10% or less, based on the weight of the second ink layer 4, because too large an amount of the thermoplastic resin can provides too high a cohesion in the second ink layer 4.

The second ink layer 4 may preferably comprise a water-soluble polyester resin and a wax, and it is preferred that the second ink layer 4 does not substantially contain another thermoplastic resin. The component other than the water-soluble polyester resin, which is contained in the second ink layer 4 in view of a sharp-melting property, i.e., a wax or a mixture of a wax and a thermoplastic resin, may preferably have a melting point of 50° C. or higher and may preferably have a melt viscosity of 500 cps or smaller at 150° C.

In the above-mentioned embodiment of the present invention, the ink layer of the thermal transfer material has a four-layer structure. However, the second, third and/or fourth ink layer can further be function-separated so that the total ink layer disposed on the support may have a structure comprising five or more layers. For example, it is preferred that the fourth ink layer is function-separated into a layer capable of developing an adhesion to a recording medium under heating and a layer capable of developing a film-forming property under heating to bridge concavities between convexities of the recording medium surface, so that the total ink layer disposed on the support may have a five-layer structure.

Hereinbelow, there is described an embodiment of the thermal transfer recording method using the thermal transfer material according to the present invention, by referring to an embodiment using a thermal transfer material 1 as shown in FIG. 1.

Figure 2:
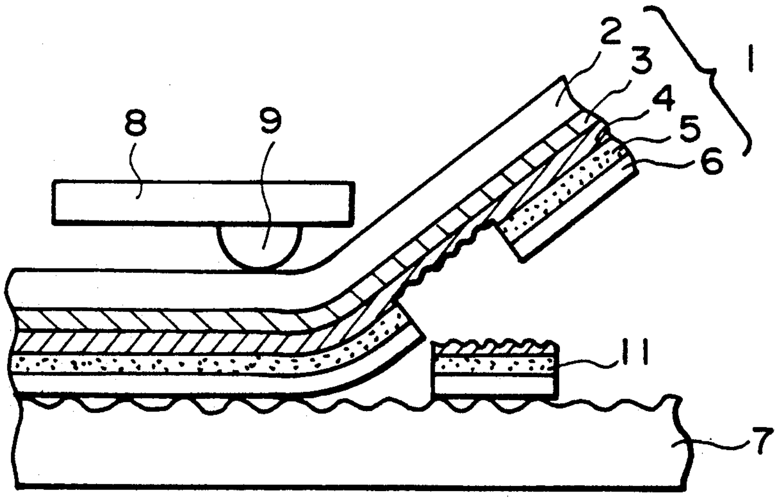
FIG. 2 is a schematic sectional view which illustrates a thermal transfer recording method using an embodiment of the thermal transfer material according to the present invention.

Referring to FIG. 2, the thermal transfer material 1 is superposed on a recording medium 7 so that the fourth ink layer 6 contacts or abuts on the recording medium 7, and a pattern of heat energy is applied to the thermal transfer material 1 from the support 2 side by means of a heat-generating element 9 of a thermal head 8. The transfer material 1 is peeled from the recording medium 7 immediately after the transfer material is heated and before the strength of the second ink layer 4 becomes sufficiently large (preferably, after 20 msec or less, more preferably 10 msec or less, counted from the energy application).

Even under such heat energy application, the first ink layer 3 of the above-mentioned thermal transfer material 1 strongly adheres to the support 2 and is not transferred to the recording medium 7 side. However, the fourth ink layer 6 develops an adhesion to the recording medium 7 and is transferred to the recording medium 7 while retaining an appropriate film strength. Further, the heated portion of the second ink layer 4 is sharply melted and changed to a semiliquid or liquid state, and the melt viscosity thereof decreases, whereby cohesion failure can very easily occur.

On the other hand, because the non-heated portion of the second ink layer 4 does not melt, it retains a high cohesion and a strong adhesion strength between the first ink layer 3 and the third ink layer 5. At this time, the third ink layer 5 strongly adheres to the fourth ink layer 6 both in the heated portion and in the non-heated portion. As a result, the adhesion contrast between the heated and non-heated portions becomes extremely clear, and a transferred image 11 is formed on the recording medium 7.

Next, there is described an embodiment of the correction or erasing method using the thermal transfer material according to the present invention.

Figure 3:
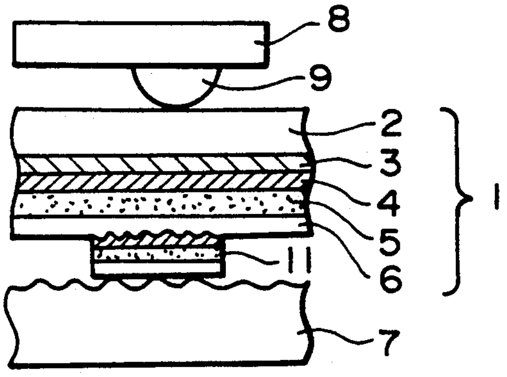
FIGS. 3 and 4 are schematic sectional views each illustrating a lift-off correction method using the thermal transfer material according to the present invention.

Referring to FIG. 3, there has been formed a transferred recorded image 11 on a recording medium 7 by using the thermal transfer material of the present invention. The thermal transfer material 1 is superposed on the recording medium 7 so that the fourth ink layer 6 contacts or abuts on the transferred image 11, and a heat energy is applied to a portion of the thermal transfer material 1 corresponding to that equal to or larger than the transferred image 11, from the support 2 side of the thermal transfer material 1 by means of a heat-generating element 9 of a thermal head 8. At this time, the fourth ink layer 6 of the thermal transfer material 1 develops an adhesion in the same manner as in the above-mentioned recording operation and adheres to the transferred image 11 on the recording medium 7. Further, the cohesion in the second ink layer 4 of the thermal transfer material 1 decreases.

Figure 4:
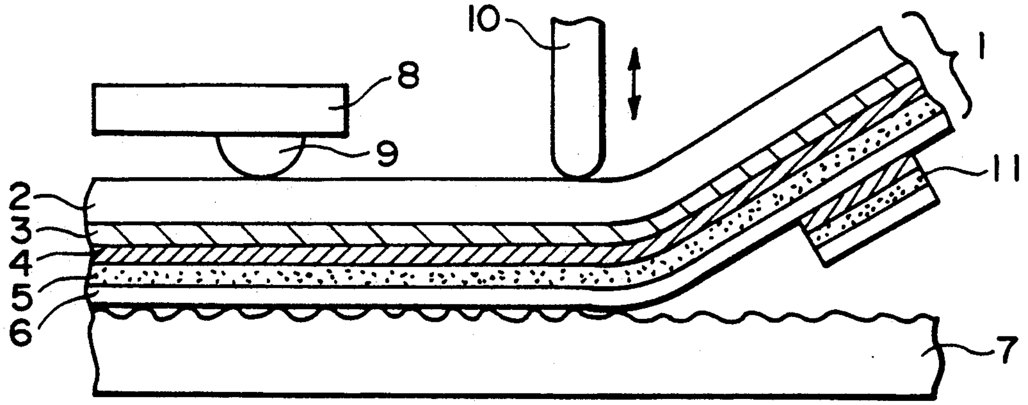

However, in such an embodiment, the thermal transfer material 1 is peeled from the recording medium 7 after the strength of the above-mentioned second ink layer 4 (i.e., the adhesion between the first ink layer 3 and the third ink layer 5 and the cohesion in the second ink layer 4) is restored (preferably, after 50 msec or more, more preferably 100 msec or more, counted from the energy application), e.g., by protruding a peeling control member 10 for controlling the peeling of the thermal transfer material 1 from the recording medium 7, toward the recording medium 7 as shown in FIG. 4. At this time, the adhesion between the third ink layer 5 and the transferred image 11 also increases and the lift-off correction of the transferred image 11 is attained by using the above-mentioned thermal transfer material 1.

Hereinbelow, the present invention will be explained in further detail with reference to Examples.

EXAMPLES 1-4

| | |
|---|---|
| Prescription 1 (coating liquid 1) | |
| Terephthalic acid | 29 wt. % |
| Isophthalic acid | 25 wt. % |
| Ethylene glycol | 20 wt. % |
| Polyethylene glycol (weight-average molecular weight (Mw) = 1540) | 6 wt. % |
| Dodecanedioic acid ($HOOC-(CH_2)_{10}-COOH$) | 15 wt. % |
| Sodium 5-sulfoisophthalate | 5 wt. % |
| Prescription 2 (coating liquid 2) | |
| Terephthalic acid | 26 wt. % |
| Isophthalic acid | 22 wt. % |
| Dodecanedioic acid | 20 wt. % |
| Ethylene glycol | 12 wt. % |
| 1,4-Butanediol | 15 wt. % |
| Sodium 5-sulfoisophthalate | 5 wt. % |
| Prescription 3 (coating liquid 3) | |
| Terephthalic acid | 26 wt. % |
| Isophthalic acid | 22 wt. % |
| Dodecanedioic acid | 20 wt. % |
| Ethylene glycol | 14 wt. % |
| Propylene glycol | 13 wt. % |
| Sodium 5-sulfoisophthalate | 5 wt. % |
| Prescription 4 (coating liquid 4) | |
| Terephthalic acid | 26 wt. % |
| Isophthalic acid | 22 wt. % |
| Dodecanedioic acid | 20 wt. % |
| Ethylene glycol | 12 wt. % |
| 1,4-Butanediol | 15 wt. % |
| Sodium 5-sulfoisophthalate | 5 wt. % |

Four species of water-soluble polyester resins were obtained according to the above-mentioned formulations and monomer charge ratios. These water-soluble polyester resin had a weight-average molecular weight (Mw) and a glass transition point (Tg) as shown in the following Table 1.

TABLE 1

| Water-soluble polyester resin | Tg | $\overline{Mw}$ |
|---|---|---|
| Prescription | | |
| 1 | 20° C. | 20,000 |
| 2 | 3° C. | 16,000 |
| 3 | 3° C. | 16,000 |
| 4 | 3° C. | 10,000 |

Each of the thus prepared water-soluble polyester resins corresponding to the Prescriptions 1-4 was dissolved in a solvent mixture (water/isopropyl alcohol=55/20), whereby four species of polyester resin coating liquids 1-4 having a non-volatile content of 25%.

| | |
|---|---|
| Prescription 5 (coating liquid 5) | |
| Carnauba wax aqueous dispersion (non-volatile content: 26 parts of carnauba wax (m.p. 83° C.) and 4 parts of a nonionic surfactant) | 100 parts |
| Prescription 6 (coating liquid 6) | |
| Ethylene-vinyl acetate copolymer (non-volatile content = 44%, base resin: MI (melt index) = 150, vinyl acetate content = 28%) | 22.7 parts |
| Carbon black aqueous dispersion | 60.0 parts |

-continued

| | |
|---|---|
| (non-volatile content = 25%) | |
| Water | 17.3 parts |
| Prescription 7 (coating liquid 7) | |
| Ethylene-vinyl acetate copolymer emulsion (non-volatile content = 44%, base resin: MI (melt index) = 150, vinyl acetate content = 28%) | 54.5 parts |
| Ethylene-methacrylic acid-styrene copolymer[*1] emulsion (non-volatile content = 25%, ethylene content = 88%) | 32.0 parts |
| Water | 13.5 parts |

[*1]A copolymer obtained by grafting 40% of styrene on an ethylene-methacrylic acid copolymer (ethylene/methacrylic acid = 88/12)

The components of the above Prescriptions 5–7 were respectively mixed uniformly by means of a propeller-type stirrer to prepare coating liquids 5–7.

The coating liquid 1 was applied onto a 9 micron-thick polyethylene terephthalate film as a support by means of an applicator and then dried at 60° C. by using hot air to form a first ink layer. Then, the coating liquid 5 was applied onto the first ink layer and dried at 60° C. to form thereon a second ink layer. Thereafter, the coating liquids 6 and 7 were successively applied onto the second ink layer and dried at 40° C. to successively form thereon a third ink layer and a fourth ink layer, whereby a thermal transfer material (I) according to the present invention was observed (Example 1).

Separately, the above-mentioned coating liquids 2, 5, 6 and 7 were successively applied onto a support and then dried in the same manner as in Example 1, whereby a thermal transfer material (II) was obtained (Example 2).

Further, the above-mentioned coating liquids 3, 5, 6 and 7 were successively applied onto a support and then dried in the same manner as in Example 1, whereby a thermal transfer material (III) was obtained (Example 3).

Further, the above-mentioned coating liquids 4, 5, 6 and 7 were successively applied onto a support and then dried in the same manner as in Example 1, whereby a thermal transfer material (IV) was obtained (Example 4).

In each of the thermal transfer materials prepared above, the first and second ink layers had a thickness of 1.0 micron, the third ink layer had a thickness of 1.5 micron, and the fourth ink layer had a thickness of 5.0 microns.

COMPARATIVE EXAMPLE 1

A polyester resin (trade name: Vylon 30S, mfd. by Toyobo K.K., Tg=6° C., number-average molecular weight=about 20,000) was dissolved in methyl ethyl ketone to prepare a coating liquid 8 (non-volatile content=15%).

The above-mentioned coating liquids 8, 5, 6 and 7 were successively applied onto a support and then dried in the same manner as in Examples 1–4, whereby a thermal transfer material (V) was obtained.

Then, the five kinds of thermal transfer materials obtained in the above Examples 1–4 and Comparative Example were respectively slit into a 8 mm-wide ribbon, and recording and lift-off correction were effected on two recording media, i.e., bond paper having a low surface smoothness (Bekk smoothness 2–3 sec) and typewriter paper T-21 having a high surface smoothness (Bekk smoothness 40 sec, mfd. by Life Co., U.S.A.), by means of a thermal printer (trade name: Electronic Typewriter SP400X, mfd. by Canon K.K.). Thus, the recording and lift-off correction characteristics were evaluated.

Incidentally, in the above-mentioned typewriter SP400X, a heater is incorporated in the thermal head in order to heat a thermal transfer material up to a temperature higher than room temperature prior to a recording operation. However, in this evaluation, the above-mentioned heater was not energized. Further, the lift-off correction characteristic was evaluated by loading each of the above-mentioned thermal transfer materials (I)–(V) in the storage part of the typewriter SP 400X for storing a heat-sensitive correction tape.

Prior to the evaluation of the correction characteristic, the printing characteristics of the above-mentioned thermal transfer materials (I)–(V) were evaluated. As a result, all of these thermal transfer materials provided excellent recorded images showing a good edge-cutting property.

The correction characteristic was evaluated under normal (or room) temperature (25° C.)—normal humidity (50% RH) conditions, and under normal temperature—low humidity (10% RH) conditions, because paper as a recording medium sensitively changed its characteristic, particularly its surface condition, depending on a change in humidity. The thus obtained results are shown in the following Table 2.

TABLE 2

| | Thermal transfer material | 25° C./50% RH | | | | 25° C./10% RH | | | |
|---|---|---|---|---|---|---|---|---|---|
| | | Printing | | Correction | | Printing | | Correction | |
| | | Bond paper | T-21 | Bond paper | T-21 | Bond paper | T-21 | Bond paper | T-21 |
| Example | | | | | | | | | |
| 1 | (I) | ◎ | ◎ | ◎ | ◎ | ○ | ◎ | ○ | ○ |
| 2 | (II) | ◎ | ◎ | ◎ | ◎ | ○ | ◎ | ○ | ○ |
| 3 | (III) | ◎ | ◎ | ◎ | ◎ | ○ | ◎ | ○ | ○ |
| 4 | (IV) | ◎ | ◎ | ◎ | ◎ | ○ | ◎ | ○ | ○ |
| Comp. Example | | | | | | | | | |
| 1 | (V) | ◎ | ◎ | ◎ | ◎ | ○ | ◎ | X | X |

In the above Table 2, the symbols have the following meanings.

◎ (Printing): The recorded image showed good edge clearness (i.e., the edge portion of the recorded image corresponded to the heated portion).

(Correction): The recorded image was completely removed by lift-off correction without correction trace or reverse transfer.

∘ (Printing): The recorded image became somewhat thinner and the edge portion thereof was somewhat indicated, but the recorded image was not problematic in practice.

(Correction): Somewhat correction trace was observed, but it was hardly legible or discernible and was not problematic in practice.

x (Printing): The recorded image became thinner and was lacking.

(Correction): Reverse transfer occurred and the recorded image remained partially or completely on the recording medium. The resultant recorded image was legible.

EXAMPLES 5-9

The above-mentioned coating liquid 2 containing a water-soluble polyester resin and a carnauba wax aqueous dispersion (non-volatile content: 30% inclusive of 4% of a surfactant) were uniformly mixed by means of a propeller-type stirrer in various proportions so as to provide various non-volatile contents as shown in the following Table 3, whereby coating liquids 9-13 were prepared.

TABLE 3

| Coating liquid No. | Coating liquid 2 | Carnauba wax |
|---|---|---|
| 9 | 10 parts | 90 parts |
| 10 | 20 | 80 |
| 11 | 30 | 70 |
| 12 | 40 | 60 |
| 13 | 50 | 50 |

The coating liquid 2 was applied onto a 9 micron-thick polyethylene terephthalate film as a support by means of an applicator and then dried by using hot air to form a first ink layer. Then, the coating liquid 9 was applied onto the first ink layer and then dried by using hot air to form thereon a second ink layer. Thereafter, the coating liquids 6 and 7 were successively applied onto the second ink layer and dried by using hot air to successively form thereon a third ink layer and a fourth ink layer, whereby a thermal transfer material (VI) was obtained (Example 5).

In the thermal transfer materials prepared above, the first and second ink layers had a thickness of 1.0 micron, the third ink layer had a thickness of 1.5 micron, and the fourth ink layer had a thickness of 5.0 microns.

Separately, the above-mentioned coating liquids 2, 10, 6 and 7 were successively applied onto a support and then dried in the same manner as in Example 5, whereby a thermal transfer material (VII) was obtained (Example 6).

Further, the above-mentioned coating liquids 2, 11, 6 and 7 were successively applied onto a support and then dried in the same manner as in Example 5, whereby a thermal transfer material (VIII) was obtained (Example 7).

Further, the above-mentioned coating liquids 2, 12, 6 and 7 were successively applied onto a support and then dried in the same manner as in Example 5, whereby a thermal transfer material (IX) was obtained (Example 8).

Further, the above-mentioned coating liquids 2, 13, 6 and 7 were successively applied onto a support and then dried in the same manner as in Example 5, whereby a thermal transfer material (X) was obtained (Example 9).

The thermal transfer materials (VI) to (X) prepared above were evaluated in the same manner as in Example 1. The thus obtained results are shown in the following Table 4, wherein the meanings of the symbols ⊚, ∘ and x are the same as shown in the above-mentioned Table 2.

TABLE 2

| Example | Thermal transfer material | 25° C./50% RH Printing Bond paper | 25° C./50% RH Printing T-21 | 25° C./50% RH Correction Bond paper | 25° C./50% RH Correction T-21 | 25° C./10% RH Printing Bond paper | 25° C./10% RH Printing T-21 | 25° C./10% RH Correction Bond paper | 25° C./10% RH Correction T-21 |
|---|---|---|---|---|---|---|---|---|---|
| 5 | (VI) | ⊚ | ⊚ | ⊚ | ⊚ | ○ | ⊚ | ○ | ○ |
| 6 | (VII) | ⊚ | ⊚ | ⊚ | ⊚ | ○ | ⊚ | ⊚ | ⊚ |
| 7 | (VIII) | ⊚ | ⊚ | ⊚ | ⊚ | ○ | ⊚ | ⊚ | ⊚ |
| 8 | (IX) | ○ | ⊚ | ⊚ | ⊚ | ○ | ⊚ | ⊚ | ⊚ |
| 9 | (X) | ○ | ○ | ⊚ | ⊚ | ○ | ○ | ⊚ | ⊚ |

As described hereinabove, the thermal transfer material according to the present invention comprises a first ink layer using a water-soluble polyester resin and a second ink layer containing a water-soluble polyester resin as desired, on a support, whereby the adhesion between the first ink layer and the support and the adhesion between the first and second ink layers are excellent. As a result, the thermal transfer material according to the present invention causes substantially no correction failure due to reverse transfer at the time of a correcting operation.

Further, since the thermal transfer material according to the present invention comprises a third and a fourth ink layers each of which predominantly comprises a thermoplastic resin, it may provide good recorded image even on a recording medium having poor surface smoothness.

What is claimed is:

1. A thermal transfer recording method for printing indicia and performing lift-off correction, comprising:

providing a self-correcting thermal transfer material comprising at least a support, a first layer, a second layer, a third layer and a fourth layer disposed in this order on the support; said first layer being substantially non-transferable and capable of adhering to the support on heating and lift-off correction, and predominantly comprising a water-soluble polyester resin having a glass transition temperature of 30° C. or lower; said second layer being capable of causing separation of the third layer from the first layer on heating; said third and fourth layers predominantly comprising a thermoplastic resin, at least said third layer containing a colorant and said fourth layer substantially free of colorant;

superposing the transfer material on a recording medium so that the fourth layer is closer than the support to the recording medium;

heating the transfer material in a pattern sufficient to permit separation of said third layer from said first layer;

separating the transfer material from the recording medium immediately after the transfer material is heated and before the second layer restores its cohesive strength before said heating, thereby separating the third layer from the first layer and to leave a recorded image on the recording medium;

causing the transfer material to adhere to the recorded image under heating; and separating the transfer material from the recording medium without causing separation of the second layer, thereby to peel at least a part to the recorded image from the recording medium toward the transfer material.

2. A method according to claim 1, wherein said first layer comprises 70–100 wt. % thereof of the water-soluble polyester resin.

3. A method according to claim 2, wherein said first layer comprises 90–100 wt. % thereof of the water-soluble polyester resin.

4. A method according to claim 1, wherein said water-soluble polyester resin has a weight-average of 5,000–30,000.

5. A method according to claim 1, wherein said water-soluble polyester resin comprises a glycol ($HO—R_1—OH$) or a polyester glycol having a hydroxyl group at the end thereof; a dicarboxylic acid ($HOOC—R_2—COOH$); and a monomer having a sulfonic acid salt group or carboxylic acid group in addition to two carboxylic acid groups.

6. A method according to claim 1, wherein said second layer has a melting point of 50° C. or higher and a melt viscosity of 500 cps or lower at 150° C.

7. A method according to claim 1, wherein said second ink layer comprises 80 wt. % or more thereof of a wax.

8. A method according to claim 7, wherein said second layer comprises 90 wt. % or more thereof of a wax.

9. A method according to claim 1, wherein said third layer contains 5–80 wt % thereof of a colorant and said fourth ink layer contains 5 wt. % or less thereof of a colorant.

10. A method according to claim 9, wherein said third layer contains a binder comprising 50 wt. % or more thereof of a thermoplastic resin.

11. A method according to claim 10, wherein said binder comprises 70 wt. % or more thereof of the thermoplastic resin.

12. A method according to claim 9, wherein said fourth layer comprises a binder comprising 50 wt. % or more thereof of a thermoplastic resin.

13. A method according to claim 12, wherein said binder comprises 70 wt. % or more thereof of the thermoplastic resin.

14. A thermal transfer recording method for printing indicia and performing lift-off correction comprising:

providing a self-correcting thermal transfer material comprising at least a support, a first layer, a second layer, a third layer and a fourth layer disposed in this order on the support; said first layer being substantially non-transferable and capable of adhering to the support on heating and lift-off correction, and predominantly comprising a water-soluble polyester resin having a glass transition temperature of 30° C. or lower; said second layer being capable of causing separation of the third layer from the first layer on heating and including a water-soluble polyester resin having a glass transition temperature of 30° C. or lower; said third and fourth layers predominantly comprising a thermoplastic resin, at least said third layer containing a colorant and said fourth layer substantially free of colorant;

superposing the transfer material on a recording medium so that the fourth layer is closer to the support than the recording medium;

heating the transfer material in a pattern sufficient to permit separation of said third layer from said first layer;

separating the transfer material from the recording medium immediately after the transfer material is heated and before the second layer restores its cohesive strength before said heating, thereby separating the third layer from the first layer and to leave a recorded image on the recording medium;

causing the transfer material to adhere to the recorded image under heating; and separating the transfer material from the recording medium without causing separation of the second layer, thereby to peel at least a part of the recorded image from the recording medium toward the transfer material.

15. A method according to claim 14, wherein said first layer comprises 70–100 wt. % thereof of the water-soluble polyester resin.

16. A method according to claim 14, wherein said first layer comprises 90–100 wt. % thereof of the water-soluble polyester resin.

17. A method according to claim 14, wherein said second layer comprises a wax and the water-soluble polyester resin which constitutes 45 wt. % or less of the second ink layer.

18. A method according to claim 17, wherein said water-soluble polyester resin constitutes 40 wt. % or less of the second ink layer.

19. A method according to claim 17, wherein said wax contained in the second layer has a melting point of 50° C. or higher and a melt viscosity of 500 cps or lower at 150° C.

20. A method according to claim 14, wherein said water-soluble polyester resin constituting the second layer has a weight-average molecular weight of 5,000–25,000.

21. A method according to claim 14, wherein said water-soluble polyester resin constituting the first layer and that constituting the second ink layer comprises a glycol ($HO—R_1—OH$) or a polyester glycol having a hydroxyl group at the end thereof; a dicarboxylic acid ($HOOC—R_2—COOH$); and a monomer having a sulfonic acid salt group or carboxylic acid group in addition to two carboxylic acid groups.

22. A method according to claim 14, wherein said water-soluble polyester resin constitutes 70–100 wt. % of the first layer; said second ink layer comprises a wax and the water-soluble polyester resin which constitutes 45 wt. % or less of the second ink layer; said third ink layer contains 10–80 wt. % thereof of a colorant and said fourth ink layer contains 5 wt. % or less thereof of a colorant; and each of said third and fourth ink layers comprises a binder comprising 50 wt. % or more thereof of the thermoplastic resin.

23. A method according to claim 22, wherein the water-soluble polyester resin comprises a glycol ($HO—R_1—OH$) or a polyester glycol having a hydroxyl group at the end thereof; a dicarboxylic acid ($HOOC—R_2—COOH$); and a monomer having a sulfonic acid salt group or carboxylic acid group in addition to two carboxylic acid groups.

* * * * *

UNITED STATES PATENT AND TRADEMARK OFFICE

CERTIFICATE OF CORRECTION

PATENT NO. : 5,269,866

DATED : December 14, 1993

INVENTOR(S) : NAOKI KUSHIDA, ET AL.

It is certified that error appears in the above-identified patent and that said Letters Patent is hereby corrected as shown below:

ON TITLE PAGE

In [57] Abstract:

Line 7, "third and fourth" should read --the third and the fourth--.
Line 8, "comprises" should read --comprise--.

COLUMN 1

Line 49, "have" should read --has--.

COLUMN 2

Line 37, "poor recorded" should read --poor surface smoothness and is capable of erasing the recorded--.

COLUMN 5

Line 19, "tion)." should read --ion).--.

COLUMN 9

Line 52, "1-2.5 micron," should read --1-2.5 microns,--.

COLUMN 10

Line 41, "provides" should read --provide--.

UNITED STATES PATENT AND TRADEMARK OFFICE

CERTIFICATE OF CORRECTION

PATENT NO. : 5,269,866

DATED : December 14, 1993

INVENTOR(S) : NAOKI KUSHIDA, ET AL.

It is certified that error appears in the above-identified patent and that said Letters Patent is hereby corrected as shown below:

COLUMN 12

Line 40, "resin" should read --resins--.
Line 56, "having" should read --have--.

COLUMN 14

Line 9, "a" should read --an--.
Line 65, "∘(Printing):" should read --○(Printing):--.

COLUMN 16

Line 10, "∘" should read --○--.
Line 38, "layers" should read --layer--.

COLUMN 17

Line 7, "part to" should read --part of--.
Line 31, "ink" should be deleted.
Line 37, "ink" should be deleted.

COLUMN 18

Line 34, "ink" should be deleted.
Line 53, "ink" should be deleted.
Line 55, "ink" (both occurrences) should be deleted.

UNITED STATES PATENT AND TRADEMARK OFFICE
CERTIFICATE OF CORRECTION

PATENT NO. : 5,269,866

DATED : December 14, 1993

INVENTOR(S) : NAOKI KUSHIDA, ET AL.

It is certified that error appears in the above-identified patent and that said Letters Patent is hereby corrected as shown below:

COLUMN 18

Line 57, "ink" should be deleted.
Line 58, "ink" should be deleted.

Signed and Sealed this

Nineteenth Day of July, 1994

Attest:

BRUCE LEHMAN

Attesting Officer

*Commissioner of Patents and Trademarks*